J. F. ROGERS.
APPARATUS FOR THE MANUFACTURE OF ICE.
APPLICATION FILED JAN. 7, 1908.
932,329.
Patented Aug. 24, 1909.
2 SHEETS—SHEET 1.
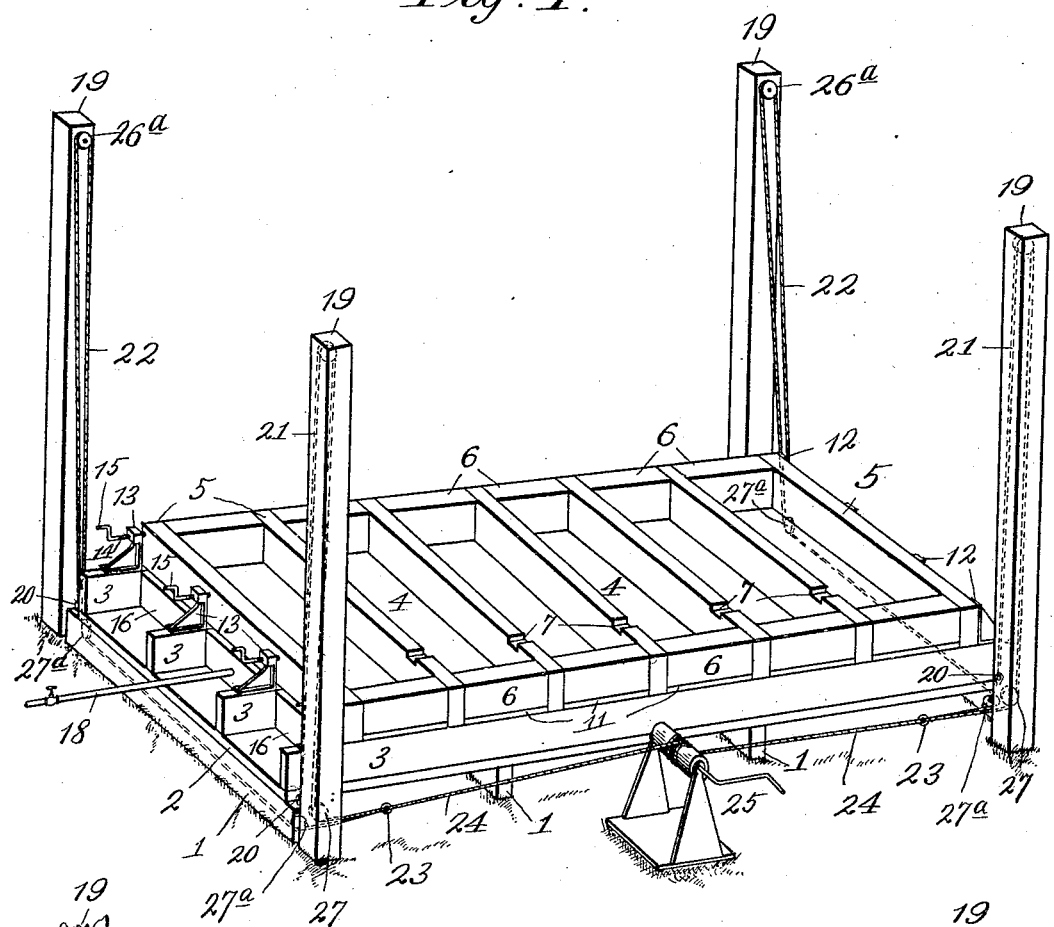
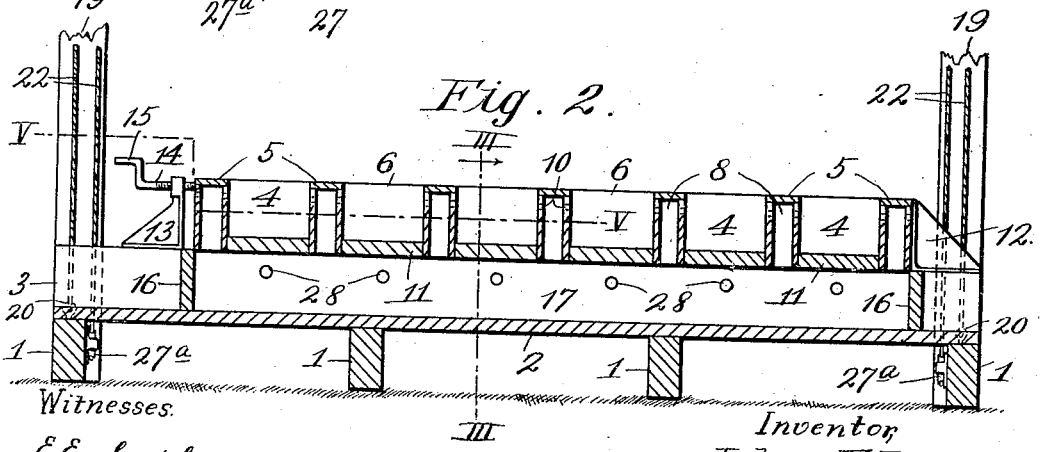
Witnesses.
E. E. Seidelman.
M. Cox
Inventor,
Judson F. Rogers,
By F. G. Fischer, atty.

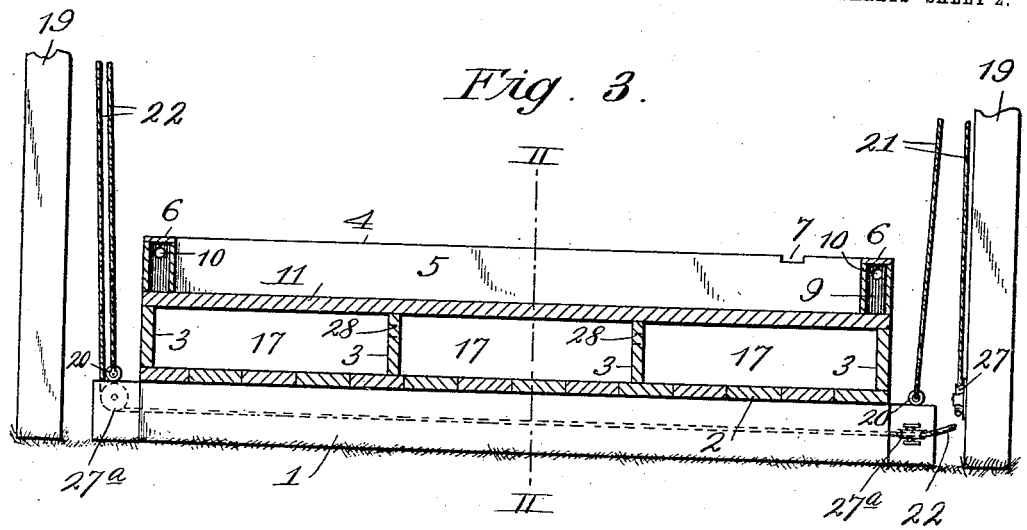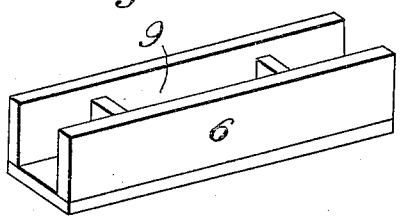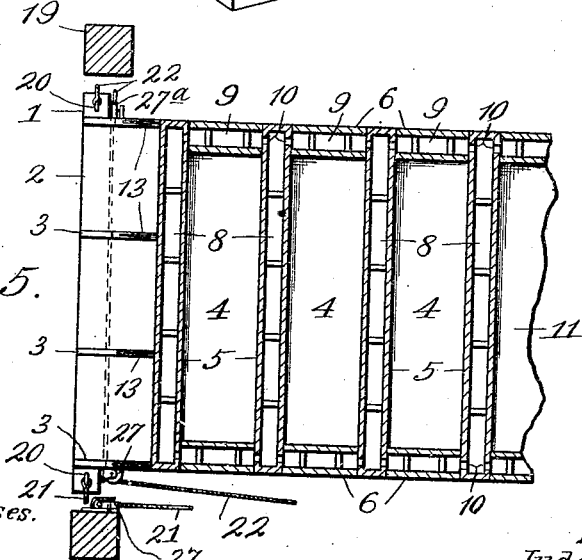

UNITED STATES PATENT OFFICE.

JUDSON F. ROGERS, OF HARRISONVILLE, MISSOURI.

APPARATUS FOR THE MANUFACTURE OF ICE.

932,329. Specification of Letters Patent. Patented Aug. 24, 1909.

Application filed January 7, 1908. Serial No. 409,609.

*To all whom it may concern:*

Be it known that I, JUDSON F. ROGERS, a citizen of the United States, residing at Harrisonville, in the county of Cass and State of Missouri, have invented certain new and useful Improvements in Apparatus for the Manufacture of Ice, of which the following is a specification.

My invention relates to improvements in apparatus for the manufacture of ice by natural cold, and is based upon the well known principle that water separated into small bodies will freeze more rapidly than when permitted to remain in one large body.

My object is to avoid the expense of cutting or hauling ice from ponds, or the expense of producing it by artificial cold.

In order that the invention may be fully understood, reference will now be made to the accompanying drawings, in which—

Figure 1 represents a perspective view of my improved apparatus. Fig. 2 is a vertical longitudinal section of same on line II—II of Fig. 3. Fig. 3 is a vertical cross-section on line III—III of Fig. 2. Fig. 4 is an inverted perspective view of one of the walls for forming the congealing-tanks. Fig. 5 is a broken horizontal section on line V—V of Fig. 2.

In erecting the apparatus I place a series of joists 1 upon the ground and cover said joists with a floor 2, I then place a series of stringers 3 lengthwise upon the floor thus completing a base or platform having raised sides for the reception of the congealing-tanks or compartments 4. Said congealing-tanks consist of longitudinal walls 5, transverse walls 6, and floors 11. Walls 5 and 6 have auxiliary chambers 8 and 9, respectively, which latter communicate with the former through ports 10 in the ends of walls 5. The middle or partition walls of the tanks have overflow openings 7, so that when water is admitted to one of the end tanks, it will overflow into the remainder of the tanks.

The ends of stringers 3 extend beyond the walls of the congealing-tanks, and are provided with clamps for forcing the longitudinal walls of the tanks against the ends of the transverse walls 6 and the longitudinal edges of the floors 11 with sufficient pressure to prevent the water leaking from the tanks. These clamps consist of brackets 12 and 13, which latter are provided with screws 14, having cranks 15, so that the screws may be forced against the wall of the adjacent tank.

16 designates a plurality of doors for closing the openings of a series of main chambers 17 formed by floor 2, stringers 3, and floors 11.

18 designates a valve-controlled steam-pipe for conducting steam into the central main chambers.

19 designates four posts which are placed adjacent the two endmost joists 1, the ends of which extend beyond floor 2 and are provided with eye-bolts 20.

21 22 designate cables attached at their ends to eye-bolts 20 and a pair of rings 23.

24 designates a pair of cables attached at their ends to rings 23 and a windlass 25. Cables 21 extend upward over a pair of guide-pulleys 26 and then down beneath a pair of guide-pulleys 27, on two of the posts 19. Cables 22 extend upward over a pair of guide-pulleys 26$^a$, on the other two posts, and then down beneath four guide-pulleys 27$^a$ on the two endmost joists 1.

In practice water is admitted to one of the endmost congealing-tanks and after filling the same, successively fills the other tanks by overflowing from one to the other through openings 7. It is then congealed by the cold air coming into contact with the upper surface thereof. This congealing process is hastened by removing or opening doors 16 so that the cold air may pass into the main chambers 17, and thence upward into the auxiliary chambers 8 and 9, so that the water within the tanks will be surrounded by cold air and thus congeal within a comparatively short time.

After the water has been frozen into cakes of ice, the sides of the tanks are loosened therefrom by closing the doors 16 and admitting steam through pipe 18 into the central main chambers from which it flows into the outer main chambers through ports 28 in the intermediate stringers 3. The steam then flows from the two outermost chambers 17 into the auxiliary chambers 8 and from thence into chambers 9 through ports 10. This warms the sides and floor of the tanks so that when the clamps are loosened, the sides of the tanks may be readily taken down and leave the cakes of ice resting upon the floors 11, from whence they may be removed for storage.

To avoid the expense of hauling the ice to the point of storage, I prefer to build my apparatus beside the storage or ice-house, so that after the ice has been formed into cakes the entire apparatus may be raised by turning the windlass 25 until the tanks are on a level with the upper door in the ice-house. It will only be necessary then to transfer the cakes from floors 11 to said ice-house.

Having thus described my invention, what I claim is:

1. A knock-down congealing apparatus, comprising a plurality of removable vertical hollow walls, a plurality of bottom members interposed between said hollow walls to space the same to form congealing tanks hollow transverse end walls resting on said bottom members and communicating with said first hollow walls and a walled platform supporting said walls and bottoms to form chambers for a freezing element.

2. A knock-down congealing apparatus, comprising a plurality of removable hollow walls, bottoms interposed therebetween to form congealing tanks by spacing said hollow walls, hollow end walls also spacing said walls and communicating therewith and a walled base supporting said tanks and forming inclosed chambers therewith, said hollow walls being open to said chambers to form continuations thereof.

3. A knock-down congealing apparatus comprising a plurality of removable hollow walls, bottoms interposed between the walls at their lower edges to form congealing tanks by spacing said walls, hollow end walls resting on said bottoms and having communication with said first hollow walls, and a walled platform supporting said tanks forming chambers for freezing elements, said chambers communicating with said hollow walls to distribute said freezing elements.

4. A knock-down congealing apparatus comprising a walled platform, a series of chambered walls adapted to form freezing tanks, said walls having open communication with said air chambers, means for clamping said walls to form said tanks, means for subjecting said air-chambers to atmospheric temperature or a raised temperature and means for raising said platform to varying levels for removal of the finished ice.

5. A knock-down congealing apparatus, comprising a platform having vertical walls, a plurality of alternate horizontal and vertical members supported by said platform and clamped thereon to form freezing tanks, said vertical members being removable to leave the ice-cakes on an unobstructed surface, and means for raising said platform to remove said ice.

6. In an apparatus of the character described, a series of congealing-tanks comprising separable hollow walls and bottoms, means for supporting same above the ground, and means for raising said tanks consisting of guide-pulleys adjacent thereto, a windlass, and cables running over the guide-pulleys and attached at their ends to the windlass and the supports for the tanks.

In testimony whereof I affix my signature, in the presence of two witnesses.

JUDSON F. ROGERS.

Witnesses:
   F. G. FISCHER,
   M. COX.